United States Patent [19]
Boody et al.

[11] Patent Number: 5,407,384
[45] Date of Patent: Apr. 18, 1995

[54] APPARATUS FOR PROCESSING AN ANIMAL HALF CARCASS TO RECOVER LOIN AND RIBS

[75] Inventors: Lawrence D. Boody, Roane; Harrison A. Ailey, Knox; David L. Chappell, Loudon; Bradford L. Brewster, Anderson, all of Tenn.

[73] Assignee: Acraloc Corporation, Oak Ridge, Tenn.

[21] Appl. No.: 204,879

[22] Filed: Mar. 2, 1994

Related U.S. Application Data

[63] Continuation-in-part of Ser. No. 995,132, Dec. 12, 1992, abandoned, which is a continuation-in-part of Ser. No. 873,378, Apr. 24, 1992, Pat. No. 5,234,371.

[51] Int. Cl.⁶ ............................................. A22C 25/18
[52] U.S. Cl. ............................................. 452/171; 452/134
[58] Field of Search ................ 452/171, 134, 135, 150

[56] References Cited

U.S. PATENT DOCUMENTS

| | | | |
|---|---|---|---|
| 2,510,173 | 6/1950 | Harter | 452/171 |
| 3,352,011 | 11/1967 | Alexander et al. | 30/140 |
| 3,546,737 | 12/1970 | Neebel et al. | 17/1 |
| 3,771,196 | 11/1973 | Doerfer et al. | 17/1 R |
| 4,189,806 | 2/1980 | Van Heyningen | 17/52 |
| 4,979,269 | 12/1990 | Norrie | 452/134 |
| 5,234,371 | 8/1993 | Andre et al. | 452/171 |
| 5,295,898 | 3/1994 | Andre et al. | 452/171 |

*Primary Examiner*—Willis Little
*Attorney, Agent, or Firm*—Pitts & Brittian

[57] ABSTRACT

An apparatus for separating a loin and ribs from a carcass half that incorporates a scribe saw assembly immediately in advance of a loin knife for the purpose of cutting through the ribs of the carcass. This scribe saw assembly is mounted from the lever arm of a roller, the roller being biased against the surface of a carcass and moving vertically with response to that surface. Thus, the scribe saw assembly also moves vertically in unison with the roller. The scribe saw blade creates a kerf for passage of a portion of the blade of the loin puller. Provision is made so that the lateral orientation of the blade of the saw corresponds to the lateral orientation of the portion of the loin knife that is to pass through the cut ribs. When the position of the loin knife is changed, the lateral position of the saw blade is changed accordingly. The apparatus also provides for the flattening of remaining ribs and the separation of these flattened ribs from the rib fat of the carcass half after the removal of the loin. To further assist in orienting a carcass with regard to the scribe saw, the loin knife and the rib-fat separating knife, the apparatus is provided with an orientation side plate against which the carcass half moves through the apparatus.

23 Claims, 5 Drawing Sheets

APPARATUS FOR PROCESSING AN ANIMAL HALF CARCASS TO RECOVER LOIN AND RIBS

This patent application is a Continuation-in-Part application based upon patent application Ser. No. 07/995,132 filed Dec. 12, 1992, abandoned, which was a Continuation-in-Part application based upon parent patent application Ser. No. 07/873,378 filed Apr. 24, 1992, now U.S. Pat. No. 5,234,371 issued Aug. 10, 1993.

TECHNICAL FIELD

This invention relates to apparatus used in the meat processing industry, and more particularly to apparatus used to separate the loin portion of meat and the ribs from carcass halves. Although the apparatus described herein was designed for the purpose of separating pork loins and ribs, it can be used for similar operation on other types of meat.

BACKGROUND ART

In the field of meat processing, such as pork processing, it is well known that excess fat is removed from the back of the loin of a animal carcass to recover the loin before final cutting and/or packing the meat for market. Further, it is well known that the ribs are separated from the remaining portion of the carcass to provide "short ribs" together with "fat back". Typically, the carcass of the animal is cut into two halves. Each carcass half includes a loin to be removed from the back fat. The loin is adjacent to the back bone and is situated between the ribs and the outer layer of fat. After the removal of the loin, the remaining portion of the carcass is moved to a separate device for the separation of the ribs, as short ribs, from the fat or portion to be used for bacon.

Various automatic devices have been developed to provide for the separation of the loins from the carcasses. Typical of the art is the device disclosed in U.S. Pat. No. 4,189,806 issued to W. P. Va Heyige on Feb. 26, 1980 and Canadian Patent No. 1,079,114 issued on Jun. 10, 1980. Both of these disclose the same invention and, like other known devices at that time, required the carcass to be further subdivided prior to the removal of the loin.

A device for accomplishing the automatic removal of the loin from a full half carcass is described in U.S. Pat. No. 5,234,371 owned by a common assignee of the present invention. That device is incorporated herein by reference for teachings regarding the general structure and operation of a "loin puller". It is a improvement over that device that is described fully hereinafter.

The shortcoming of the known art, including that of the above-cited U.S. Pat. No. 5,234,371, is that prior to the insertion of a half carcass into the loin puller, a cut must be made through the ribs. This is accomplished with a scribe saw in a separate device, with the half carcass after the cut being transferred to the loin puller. This involves a separate step in the processing, and the half carcass is more difficult to handle after the cut. Care must be taken so that the loin knife traverses the kerf previously made by the scribe saw blade.

Another shortcoming of all of the known devices for processing animal carcasses is that the ribs are separated from the fat in a separate device. This increases the handling of the meat, as well as necessitates a second alignment of the carcass with cutting devices for accomplishing this "rib pulling".

Accordingly, it is an object of the present invention to incorporate the cutting of the ribs of the half carcass of an animal into the loin puller such that additional handling is eliminated.

Another object of the present invention is to provide a device wherein a scribe saw is positioned in a loin puller apparatus just in advance of the loin puller blade or knife such that the carcass presents a substantially rigid body throughout the greater portion of the movement through the apparatus.

A further object of the present invention is to provide a scribe saw proximate a loin knife in a loin puller apparatus, the blade of the scribe saw being substantially aligned with the portion of the loin knife that will pass through the cut of the saw.

Still another object of the present invention is to provide for lateral motion of the blade of a scribe saw proximate a loin knife in a loin puller apparatus, this lateral motion corresponding to any lateral motion of the knife whereby the blade of the scribe saw remains substantially aligned with the portion of the loin knife as the loin knife is moved laterally to accommodate loins of different widths and depths.

An additional object of the present invention is to provide a guide plate within the loin puller apparatus to assist in guiding a carcass half toward the scribe saw and loin knife to reduce misalignment in the cutting of the carcass ribs and the removal of the loin.

It is a further object of the present invention to include the separation of ribs from the fat back of the carcass within the apparatus for removing the loin whereby a single alignment of the carcass half provides for the alignment with the scribe saw, the loin puller knife and the rib puller knife.

These and other objects of the present invention will become apparent upon a consideration of the drawings referred to hereinafter, and from a complete description thereof.

SUMMARY OF THE INVENTION

In accordance with the present invention, there is provided a loin puller apparatus that incorporates a scribe saw immediately in advance of the loin knife for the purpose of cutting through the ribs of the carcass. The lateral orientation of the blade of the saw corresponds to the lateral orientation of the portion of the loin knife that is to pass through the cut ribs. When the position of the loin knife is changed, the lateral position of the saw blade is changed accordingly. To further assist in orienting a carcass with regard to the scribe saw and loin knife, the apparatus can be provided with a orientation side plate against which the carcass moves through the apparatus. In addition, a second knife is provided, together with additional carcass feed mechanism, whereby the ribs are separated from the fat back subsequent to the loin separation.

BEST MODE FOR CARRYING OUT THE INVENTION

Figure 1:
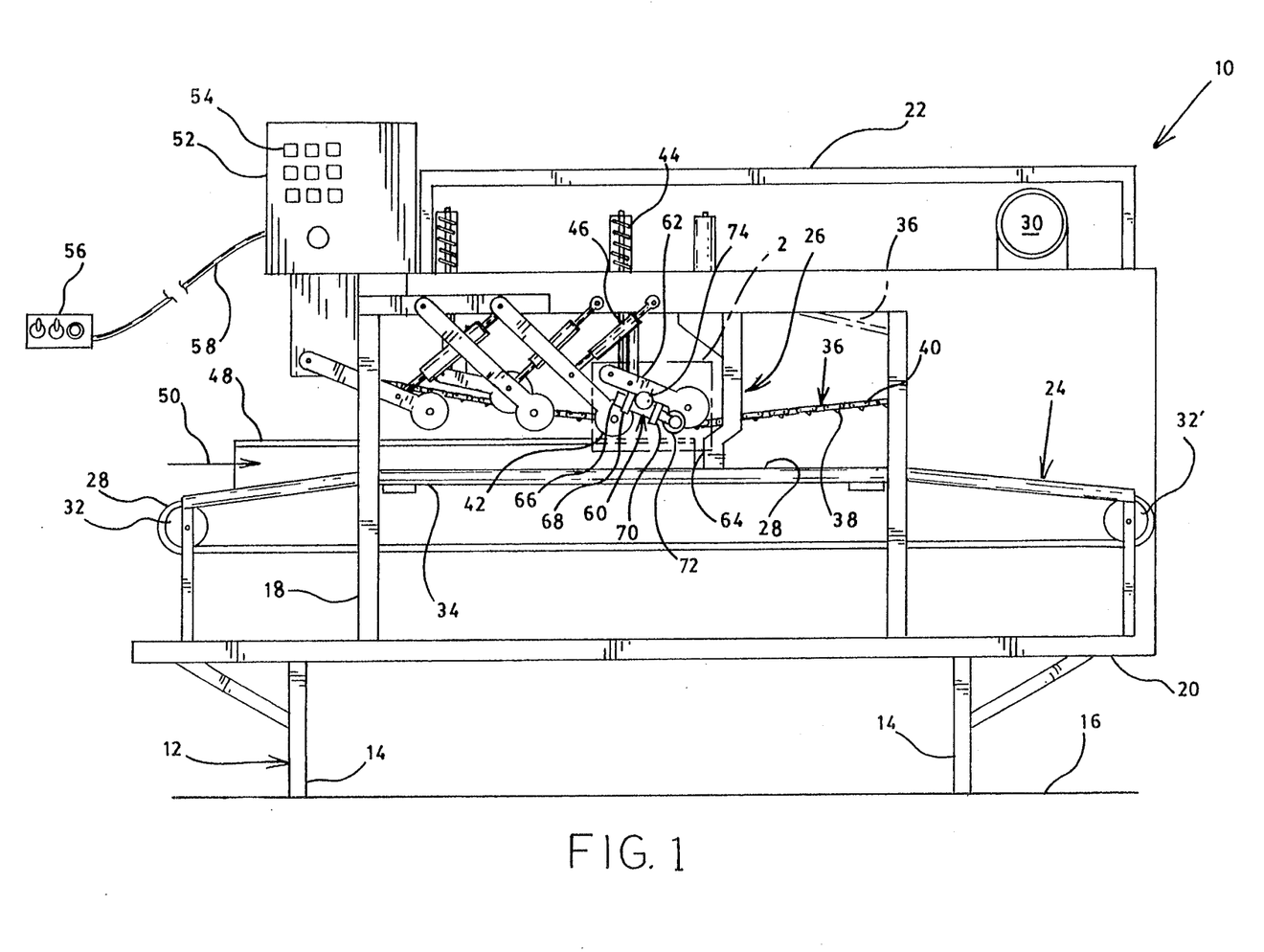
FIG. 1 is a side elevational view of a loin puller apparatus including a scribe saw mechanism according to the present invention, some portions of the base apparatus being cut away so as to show more clearly the position of the scribe saw mechanism.

An apparatus according to the present invention is shown generally at 10 in FIG. 1 which is a side elevation of a loin puller apparatus that includes a scribe saw. This apparatus has a frame 12 that is provided with leg members 14 for supporting the same from a floor 16. Uprights 18 and horizontal members 20 support the various components, and it will be understood that there are also transverse elements that cannot be seen in this figure that complete the frame 12. Further, there is illustrated a upper frame portion 22. Of course, it will be recognized that the configuration depicted in this and the other figures with regard to the frame is so depicted for simplicity, and is not intended to limit the frame to such configuration.

As will be understood from above-referenced U.S. Pat. No. 5,234,371, there is a conveyor means 24 for conveying the carcass half (not shown) toward the loin knife assembly 26. This conveyor means 24 has a conveyor belt 28, driven by a motor 30 (by any suitable interconnection), that runs on engagement wheels 32, 32′. The conveyor belt 28, in the area of support of a carcass portion, is substantially in contact with a work surface 34. Further, there is at least one, and preferably two (see FIG. 3), loin engagement means 36 for advancing the carcass toward the loin knife assembly 26, with this engagement means 36 having engagement teeth 38 mounted upon interconnected chain links 40. This engagement means 36 is typically driven in a desired direction by the afore-mentioned motor 30 through suitable connection. Of course, a separate drive could be used with appropriate synchronization with the movement of the conveyor belt 28.

Additional control of the carcass portion is achieved through the use of a plurality of rollers 42 that are biased downwardly against the carcass by spring elements 44 and/or piston-cylinder units 46. Further, there can be a guide plate 48 at the edge of the work surface 36 such that a person feeding a carcass into the loin puller device 10 in a direction indicated by the arrow 50 can accurately position the carcass during its movement through the device, and particularly through the knife assembly 26.

Principal control of the device 10 is through a controller 52 attached to the frame 12. This contains operational switches 54 and elements to indicate the condition of operation. In addition, there is a portable auxiliary controller 56 connected to the main controller 52 through a cable 58 for use by an operator of the device 10.

A major departure of the present invention from that shown and described in the afore-cited U.S. Pat. No. 5,234,371 is the addition of a scribe saw unit 60. Typically this unit 60 is fastened to an arm 62 that supports one of the rollers 42, e.g., the roller closest to the knife blade 64 of the knife assembly 26. Of course it will be understood that independent support and positioning can be utilized. A air (or hydraulic) motor 66 is supported within a pair of clevis-type brackets 68, 70 that are attached to, but are movable laterally with respect to, the arm 62. This motor 66 rotates a saw blade 72 in a plane generally parallel to the direction of travel of a carcass. Lateral movement, i.e., in a direction perpendicular to the plane of the saw blade 72, is achieved with a air (or hydraulic) cylinder 74 acting between the brackets 68, 70 and the arm 62. This permits the saw blade 72 to be positioned in line with the knife portion that is to pass through cut ribs of the carcass. As is discussed in the above-cited U.S. Pat. No. 5,234,371, the knife assembly 26 permits the knife 64 to be raised, lowered, or widened in cut depending upon the size of the loin. Thus, the saw blade 72 can be adjusted in position to accommodate a change in the position of the knife 64. Also, the position of the knife 64 can be adjusted to the position of the saw blade 72.

Figure 2:
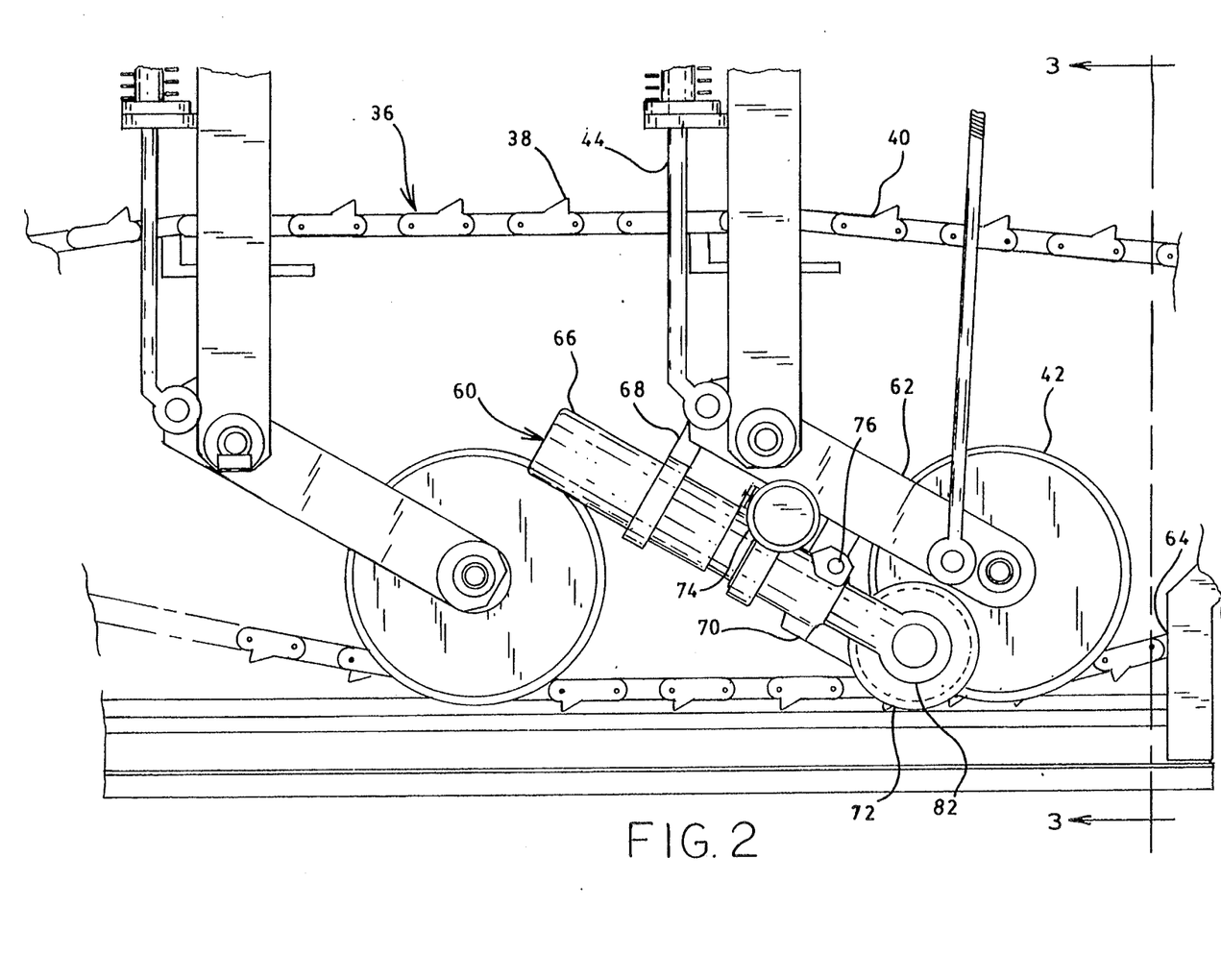
FIG. 2 is a drawing illustrating the scribe saw mechanism of the present invention as enlarged from the general region designated 2 in FIG. 1.

Greater detail of the scribe saw unit is shown in FIG. 2 which is a region generally indicated at 2 of FIG. 1. With this construction, the saw blade 72 will follow any up or down motion of the roller 42; the relative position of the two components being previously set depending upon the surface contour of the carcass. Lateral movement of the motor 66, and thus the saw blade 72, occurs along at least one pin 76 in one of the brackets, e.g., bracket 70. As stated above, this lateral movement is achieved by the cylinder 74 acting between the arm 62 and supports for the motor 66.

Actuation of the cylinder 74 for lateral movement of the saw blade 72 is achieved through one or more types of control. For example, the auxiliary controller 56 operable by a process worker can have a appropriate switch to energize a pneumatic-hydraulic system for application of fluid to the cylinder 74. Another type of control can be through a feedback signal from a position-sensing roller (not shown) that contacts the chine bone of the carcass, this signal can also control the depth and width cut for the loin knife assembly 26. Further, there can be computer control via the controller 52 for controlling the position of the scribe saw blade 72 during passage of a carcass through the machine.

Figure 3:
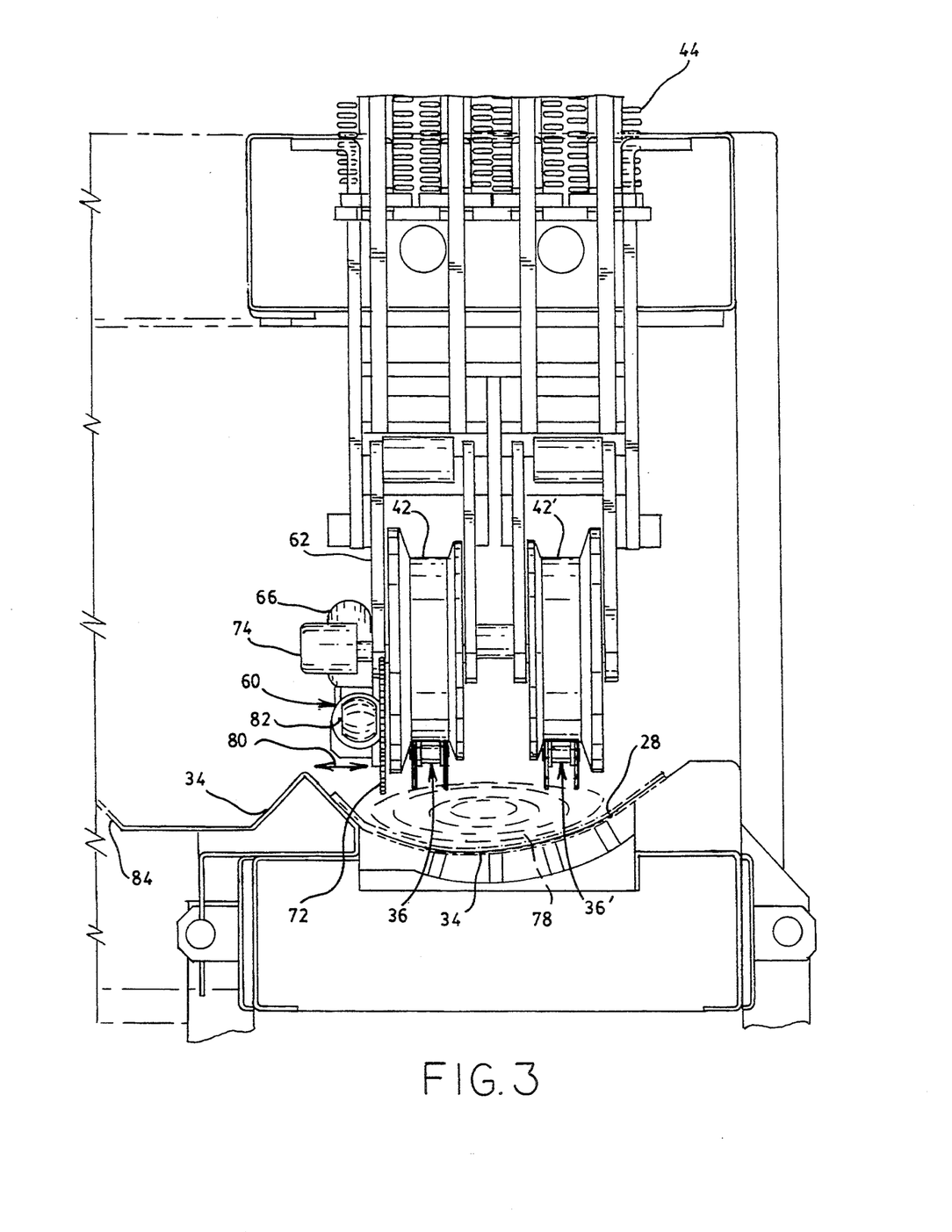
FIG. 3 is a drawing illustrating a cross-sectional view of the apparatus of FIG. 2 taken at 3—3 thereof.

An end view of the components illustrated in FIG. 2, as designated at 3—3, are shown in FIG. 3. It can be seen that in this embodiment, there are actually two parallel rollers 42, 42′, as well as two parallel engagement means 36, 36′ for optimum movement of a loin-containing carcass having a loin 78. From this view, the cylinder 74 can be seen, this cylinder providing for lateral movement of the scribe saw blade in a direction indicated by the double-headed arrow 80. Although the cylinder 74 is shown as projecting in one direction from the scribe saw assembly 60, it will be understood that it can project in the opposite direction subject to space adjacent arm 62. Since the saw motor 66 is mounted generally parallel with the roller arm 62 and the saw blade 72 is in a plane parallel to the arm, there is a gear housing 82 to accommodate the rotation of the blade 72 by the motor 66. Of course, it will be understood that other mechanism can be utilized to rotate the saw blade 72, as well as produce the desired lateral movement so as to align the blade 72 to produce a cut to match the path of the loin knife (64 in FIG. 2).

It will be recognized by persons skilled in the art that there is a right-hand half of a carcass as well as a left-hand half. The mechanisms illustrated in FIGS. 1 through 3 depict those for the left-hand portion of a carcass. It will be recognized therefore, that equivalent mechanisms are provided for the right-half portion such that there is a scribe saw assembly 60 attached to a roller arm 62 just prior to a position of a loin knife blade 64. Such a unit for the right-hand portion can be positioned immediately parallel to that for the left-hand portion, as at 84 (see afore-cited patent application Ser. No. 07/995,132), or can be a separate free-standing unit.

Figure 4:
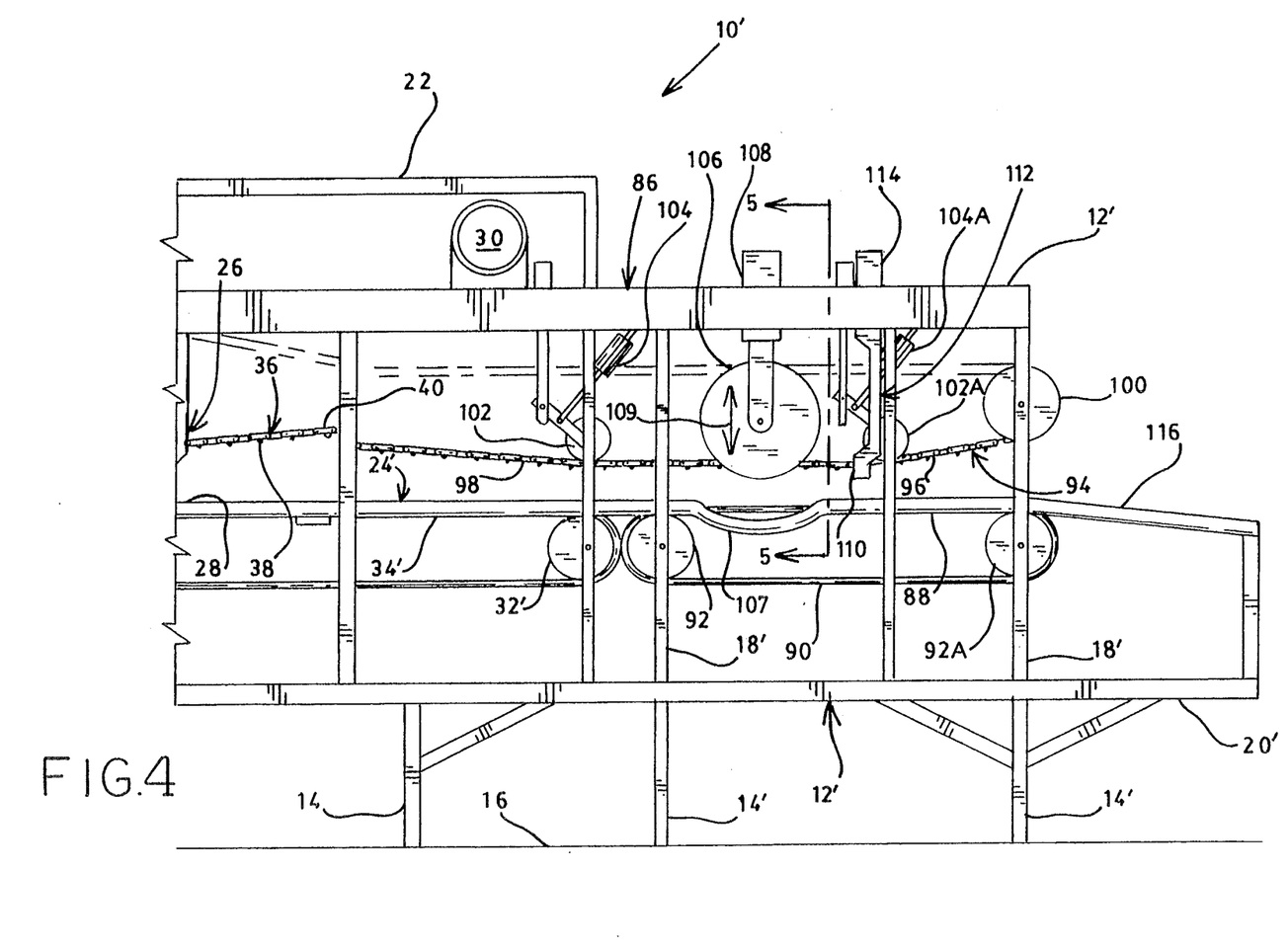
FIG. 4 is a fragmentary drawing illustrating an embodiment of the present invention wherein devices provide for the separation of ribs from the fat back of the carcass immediately subsequent to the loin removal whereby alignment and handling problems of the prior art are eliminated.

Another embodiment of the present invention is shown generally at 10' in FIG. 4. In this embodiment, the frame 12' is extended both in length and width with an extension 86 formed from longitudinal members 20' and vertical members 18' (transverse frame members are not seen in this FIG. 4). Further, additional leg members 14' are added for supporting the extension 86 of frame 12' from the floor or other support surface 16.

The extension 86 supports a work surface 88 that is aligned with the work surface 34 described above; in this embodiment the work surface 34' is modified so as to be flat rather than being sloped as in FIG. 1. A second conveyor belt 90 passes over this work surface 88, and is carried by drums 92, 92A, one of the drums being driven by the motor 30 or other suitable means so as to move conveyor belt 90 at the same speed as conveyor belt 28. This second conveyor belt 90 supports the portion of the carcass remaining after the removal of the loin (and rib portions adjacent the loin). This remaining portion can be referred to as a "loin-depleted" carcass half. A further chain-type movement member 94, with engagement projections 96 on at least a portion of the chain links 98, moves over the remaining rib portion of the carcass to assist in movement in cooperation with the conveyor belt 90. This chain member 94 moves over sprockets (only one shown) 100, with one of the sprockets also being driven from motor 30 or the equivalent. This FIG. 4 shows two idler wheels 102, 102A engaged with the chain member 94 to maintain the chain member in contact with the carcass portion therebeneath. As in FIG. 1, these idler wheels have biasing means 104, 104A to assure continuous contact even when the contour of the carcass changes along its length.

In order to achieve separation (pulling) of the ribs from the meat and fat exterior thereto, typically a large roller 106 presses against the ribs forcing the remaining carcass portion firmly against the conveyor belt 90 and work surface 88. Of course, other pressure means can be utilized for this purpose. In the preferred embodiment, the work surface 88 has a generally cylindrical concave depression as indicated at 107, with the conveyor belt 90 being pressed therein, to assist in flattening the ribs of the remaining carcass half to enhance separation of ribs from the fat. The contour of this concave depression 107 is complementary to the contour of the roller 106. The roller 106 is biased downwardly by any suitable mechanism 108. The mechanism 108 can provide a straight vertically biased movement as indicated by the double-ended arrow 109, or it can be constructed on angled biasing arms. This roller 108 substantially flattens the ribs whereby, when the loin-depleted carcass portion advances, a transverse-mounted oscillating knife 110 of a second knife assembly 112 can separate the ribs from the meat and fat external to the ribs. This separation provides ribs as "short ribs" and fat back for the meat industry. The knife assembly 112 is provided with conventional mechanism 114 for achieving height adjustment and provide the oscillation of the knife 110. After separation of the ribs from the fat layer by the knife 110, they move along an extension 116 of the work surface 88 for their individual recovery.

Figure 5:
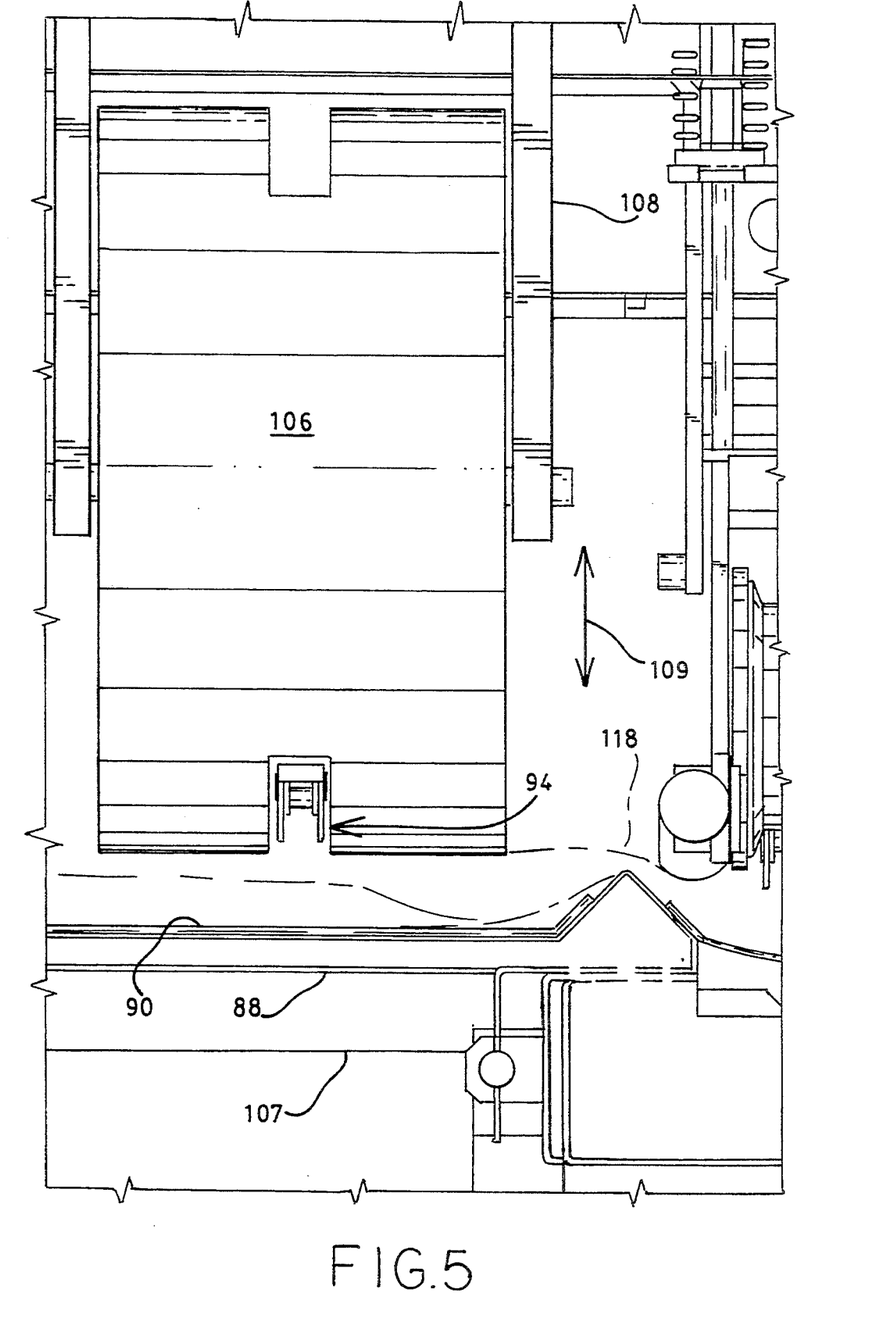
FIG. 5 is a fragmentary drawing illustrating a cross-sectional view of the apparatus of FIG. 4 taken at 4—4 thereof.

The relative position of the chain 94 and the roller 106 to the loin-removal portion of the apparatus is illustrated in the fragmentary cross section of FIG. 5. This illustrates how the roller 106 is positioned so as to press against ribs 118 to flatten the same prior to movement into the rib-severing knife blade 110 (of FIG. 4). Nonessential portions of the apparatus, for the explanation of this function, are not shown in this FIG. 5 for the sake of simplicity.

From the foregoing, it will be understood by persons skilled in the art that a considerable improvement has been made in loin puller apparatus such as that described in the afore-cited U.S. Pat. No. 5,234,371. This improvement includes accomplishing a cutting of the ribs of a half carcass just prior to the movement of the carcass to the loin separating knife. The assembly for this scribe saw provides for lateral movement of the scribe saw blade so as to position the saw blade to be aligned with the loin blade that must pass through the cut. The lateral positioning can be accomplished automatically, or "manually" under control of a machine operator. Further, in order to more easily align a carcass in the machine, a guide plate can be provided to assist the machine operator. Further, the ribs are "pulled" immediately after the loin removal to separate the ribs from the fat back while the carcass is aligned within the apparatus, as is discussed hereinabove.

Although specific reference is made to pieces of equipment herein, this is for the purpose of illustration rather than for limitation. Rather, the invention is to be limited only by the appended claims and their equivalents.

We claim:

1. An apparatus for processing an animal carcass half and separating at least the loin thereof, said apparatus comprising:

a frame for elevating a working surface a distance above a support surface;

a loin separator knife assembly carried by said frame at a selected location, said loin separator knife assembly providing for adjustment of depth and width of cut of a loin knife blade;

a conveyor belt assembly carried by said frame having a conveyor belt for conveying the carcass half toward said selected location to engage said loin knife blade;

a carcass gripper assembly carried by said frame for gripping the carcass half and forcing the carcass half against said conveyor belt and toward said selected location, said carcass gripper having a roller assembly proximate said selected location, said roller assembly mounted on a biased lever arm to maintain a roller of said roller assembly against the carcass half; and a scribe saw assembly mounted on said lever arm of said roller assembly whereby said scribe saw assembly moves vertically as said roller of said roller assembly moves vertically, said scribe saw assembly having a saw blade for cutting through at least a portion of the carcass half, said scribe saw assembly provided with means for positioning said saw blade in alignment with a portion of said loin knife blade whereby said loin knife blade passes through the carcass half at a kerf created by said saw blade.

2. The apparatus of claim 1 wherein said scribe saw assembly includes a fluid-operated motor to rotate said saw blade, and wherein said motor is carried on brackets attached to said lever arm.

3. The apparatus of claim 2 wherein said means for positioning said saw blade is a fluid-operated cylinder connected between said motor and said lever arm, and wherein said brackets permit lateral movement of said motor with respect to said lever arm during operation of said fluid-operated cylinder.

4. The apparatus of claim 1 further comprising a guide plate along said work surface extending substantially from a feed end to said selected location to orient the carcass half as an operator causes the carcass half to enter said apparatus.

5. The apparatus of claim 1 wherein said carcass gripper assembly includes a plurality of chain members and at least two sprocket members carrying said chain members, said chain members having chain links defining an endless loop configuration engaged with said sprocket members, a portion of said chain links carrying extended portions to engage the carcass half, said chain members being moved to assist in moving the carcass half toward said loin knife blade.

6. The apparatus of claim 5 further comprising biasing means for biasing each of said chain members toward the carcass half, said biasing means including at least one idler wheel positioned against said chain members and spring biasing means interposed between said idler wheel and said frame.

7. The apparatus of claim 1 further comprising:
a frame extension attached to said frame for elevating a further working surface said distance above said support surface;
a further conveyor belt carried by said frame extension for conveying a loin-depleted carcass half after engagement with said loin knife blade;
a further carcass gripper assembly carried by said frame extension for gripping the loin-depleted carcass half and forcing the loin-depleted carcass half against said further conveyor belt and moving the loin-depleted carcass half in cooperation with said further conveyor belt toward a second selected location;
pressure means carried by said frame extension for being biased against the loin-depleted carcass half to flatten ribs of the loin-depleted carcass half; and
a further knife assembly carried by said frame extension at said second selected location to separate ribs flattened by said pressure means from a fat layer between the ribs and said further conveyor belt.

8. The apparatus of claim 7 wherein said pressure means is a roller for bearing against the ribs, and biasing means cooperatively connected between said roller and said frame extension to apply pressure to said roller to flatten the ribs.

9. The apparatus of claim 8 wherein said further working surface of said frame extension is provided with a concave recess beneath said roller whereby said roller presses the loin-depleted carcass half into said concave recess to flatten the ribs of the loin-depleted carcass half prior to advancement by said further conveyor belt to said further knife assembly to separate the ribs.

10. The apparatus of claim 7 wherein said further carcass gripper assembly includes a further chain member carried on at least two further sprocket members, said further chain member having chain links defining an endless loop configuration engaged with said sprocket members, a portion of said chain links carrying extended portions to engage the loin-depleted carcass half.

11. An apparatus for processing an animal carcass half and separating at least the loin thereof, said apparatus comprising:
a frame for elevating a working surface a distance above a support surface, said frame having a carcass inlet end and a carcass outlet end;
a loin separator knife assembly carried at a selected location on said frame proximate said carcass outlet end, said loin separator knife assembly providing for adjustment of depth and width of cut of a loin knife blade;
a conveyor belt assembly carried by said frame having a conveyor belt for conveying the carcass half toward said selected location to engage said loin knife blade;
a carcass gripper assembly carried by said frame for gripping the carcass half and forcing the carcass half against said conveyor belt and toward said selected location, said carcass gripper having at least one roller mounted on a lever arm proximate said selected location and having at least one loop configuration chain member with biasing means to cause said at least one roller and said at least one chain member to press the carcass half against said conveyor belt, said chain member having a plurality of chain links, at least a portion of said chain links having extended portions to engage the carcass half; and
a scribe saw assembly mounted on said lever arm of said at least one roller, said scribe saw assembly having a saw blade for cutting through at least a portion of the carcass half, said scribe saw assembly provided with means for positioning said saw blade in alignment with a portion of said loin knife blade whereby said loin knife blade passes through the carcass half at a kerf created by said saw blade.

12. The apparatus of claim 11 wherein said scribe saw apparatus is provided with a motor mounted from said lever arm with brackets, wherein said means for positioning said saw blade is a fluid-operated cylinder connected between said motor and said lever arm, and wherein said brackets permit lateral movement of said motor with respect to said lever arm during operation of said fluid-operated cylinder.

13. The apparatus of claim 11 further comprising a guide plate along said work surface extending substantially from said inlet end to said selected location to orient the carcass half as an operator causes the carcass half to enter said loin puller apparatus.

14. The apparatus of claim 11 further comprising:
a frame extension attached to said frame for elevating a further working surface said distance above said support surface;
a further conveyor belt assembly carried by said frame extension for conveying a loin-depleted carcass half after engagement with said loin knife blade;
a further carcass gripper assembly carried by said frame extension for gripping the loin-depleted carcass half and forcing the loin-depleted carcass half against said further conveyor belt and moving the loin-depleted carcass half in cooperation with said further conveyor belt toward a second selected location;

a pressure roller biased against the loin-depleted carcass half to flatten ribs of the loin-depleted carcass half; and a further knife assembly carried by said frame extension at said second selected location to separate ribs flattened by said pressure roller from a fat layer between the ribs and said further conveyor belt.

15. The apparatus of claim 14 wherein said further working surface is provided with a concave depression to cooperate with said pressure roller for flattening the ribs prior to advancement of the loin-depleted carcass half to said further knife assembly to separate the ribs.

16. The apparatus of claim 14 wherein said further carcass gripper assembly includes a further chain member carried on at least two further sprocket members, said further chain member having chain links defining an endless loop configuration engaged with said sprocket members, a portion of said chain links carrying extended portions to engage the loin-depleted carcass half.

17. An apparatus for processing an animal carcass half and separating the loin and ribs thereof, said apparatus comprising:

a frame and a frame extension for elevating a working surface and a further working surface a distance above a support surface, said frame having a carcass inlet end and a carcass outlet end;

a loin separator knife assembly carried at a selected location on said frame proximate said carcass outlet end, said loin separator knife assembly providing for adjustment of depth and width of cut of a loin knife blade;

a conveyor belt assembly carried by said frame having a conveyor belt for conveying the carcass half toward said selected location to engage said loin knife blade;

a carcass gripper assembly carried by said frame for gripping the carcass half and forcing the carcass half against said conveyor belt and toward said selected location, said carcass gripper having a plurality of rollers mounted on biased lever arms from said frame, at least one roller mounted on a lever arm proximate said selected location, said carcass gripper assembly further having at least one loop configuration chain member carried on sprocket members, said plurality of rollers provided with biasing means to cause said roller and said at least one chain member to press the carcass half against said conveyor belt, said chain member having a plurality of chain links, at least a portion of said chain links having extended portions to engage the carcass half;

a scribe saw assembly mounted on said lever arm of said at least one roller proximate said selected location, said scribe saw assembly having a motor mounted with brackets from said lever arm, said brackets providing for lateral movement of said motor relative to said lever arm, said motor connected to a saw blade for cutting through at least a portion of the carcass half, said scribe saw assembly provided with fluid-operated cylinder means connected between said motor and said lever arm for positioning said saw blade in alignment with a portion of said loin knife blade whereby said loin knife blade passes through the carcass at a kerf created by said saw blade;

a further conveyor belt carried by said frame extension for conveying a loin-depleted carcass half after engagement with said loin knife blade;

a further carcass gripper assembly carried by said frame extension for gripping the loin-depleted carcass half and forcing the loin-depleted carcass half against said further conveyor belt and moving the loin-depleted carcass half in cooperation with said further conveyor belt toward a second selected location;

a pressure roller biased against ribs of the loin-depleted carcass half to flatten the ribs of the loin-depleted carcass half; and a further knife assembly carried by said frame extension at said second selected location to separate ribs flattened by said pressure roller from a fat layer between the ribs and said further conveyor belt.

18. The apparatus of claim 17 further comprising a guide plate along said work surface extending substantially from a feed end to said selected location to orient the carcass half as an operator causes the carcass half to enter said apparatus.

19. The apparatus of claim 17 wherein said further working surface is provided with a concave depression to cooperate with said pressure roller for flattening the ribs prior to advancement of the loin-depleted carcass half by said further conveyor belt to said further knife assembly to separate the ribs.

20. An apparatus for processing an animal carcass half and separately separating the loin and ribs thereof, said apparatus comprising:

a frame for elevating a working surface a distance above a support surface;

a loin separator knife assembly carried by said frame at a selected location, said loin separator knife assembly providing for adjustment of depth and width of cut of a loin knife blade;

a conveyor belt assembly carried by said frame having a conveyor belt for conveying the carcass half toward said selected location to engage said loin knife blade;

a carcass gripper assembly carried by said frame for gripping the carcass half and forcing the carcass half against said conveyor belt and toward said selected location, said carcass gripper having a roller assembly proximate said selected location;

a scribe saw assembly mounted proximate said roller assembly having a saw blade for cutting through at least a portion of the carcass half, said scribe saw assembly provided with means for positioning said saw blade in alignment with a portion of said loin knife blade whereby said loin knife blade passes through the carcass half at a kerf created by said saw blade;

a frame extension attached to said frame for elevating a further working surface said distance above said support surface;

a further conveyor belt carried by said frame extension for conveying a loin-depleted carcass half after engagement with said loin knife blade;

a further carcass gripper assembly carried by said frame extension for gripping the loin-depleted carcass half and forcing the loin-depleted carcass half against said further conveyor belt and moving the loin-depleted carcass half in cooperation with said further conveyor belt toward a second selected location;

pressure means carried by said frame extension for being biased against the loin-depleted carcass half to flatten ribs of the loin-depleted carcass half; and a further knife assembly carried by said frame extension at said second selected location to separate ribs flattened by said pressure means from a fat layer between the ribs and said further conveyor belt.

21. An apparatus for processing an animal carcass half and separating at least the loin thereof, said apparatus comprising:

a frame for elevating a working surface a distance above a support surface;

a loin separator knife assembly carried by said frame at a selected location, said loin separator knife assembly providing for adjustment of depth and width of cut of a loin knife blade;

a conveyor belt assembly carried by said frame having a conveyor belt for conveying the carcass half toward said selected location to engage said loin knife blade;

a carcass gripper assembly carried by said frame for gripping the carcass half and forcing the carcass half against said conveyor belt and toward said selected location, said carcass gripper having a roller assembly proximate said selected location;

a scribe saw assembly having a saw blade for cutting through at least a portion of the carcass half, said scribe saw assembly mounted proximate said loin separator knife assembly and provided with means for positioning said saw blade vertically with regard to said carcass half and laterally in alignment with a portion of said loin knife blade whereby said loin knife blade passes through the carcass half at a kerf created by said saw blade; and a user operated controller means connected to said scribe saw assembly means to selectively effect said lateral and vertical positioning of said scribe saw blade.

22. The apparatus of claim 21 wherein said controller means is provided with switches for selectively controlling vertical and lateral movement of said scribe saw assembly.

23. The apparatus of claim 21 wherein said controller means is provided with a computer control for selectively controlling vertical and lateral movement of said scribe saw assembly.

* * * * *